Figure 1:
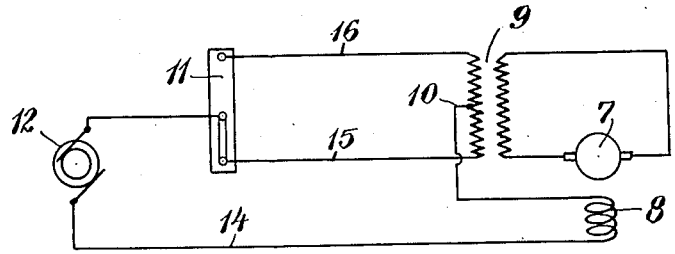

L. V. LEWIS.
ELECTRIC MOTOR CONTROL.
APPLICATION FILED APR. 9, 1910.

967,210.

Patented Aug. 16, 1910.
2 SHEETS—SHEET 1.

WITNESSES:
a. L. Verrill
M. Kirkland

INVENTOR
Lloyd V. Lewis
BY
Geo. E. Cruse
His ATTORNEY

L. V. LEWIS.
ELECTRIC MOTOR CONTROL.
APPLICATION FILED APR. 9, 1910.

967,210.

Patented Aug. 16, 1910.
2 SHEETS—SHEET 2.

WITNESSES:
A. L. Vencill
M. Kirkland

INVENTOR
Lloyd V. Lewis
BY Geo. E. Cruse
His ATTORNEY

UNITED STATES PATENT OFFICE.

LLOYD V. LEWIS, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRIC-MOTOR CONTROL.

967,210.
Specification of Letters Patent.
Patented Aug. 16, 1910.

Application filed April 9, 1910. Serial No. 554,328.

*To all whom it may concern:*

Be it known that I, LLOYD V. LEWIS, a citizen of the United States, residing at Wilkinsburg, in the county of Allegheny, State of Pennsylvania, have invented certain new and useful Improvements in Electric-Motor Control, of which the following is a specification.

My invention relates to the control of motors of the commutator type when operated by alternating current power, and particularly to the control from a distant point of the direction of rotation of such motors.

I will describe several systems of motor control embodying my invention and then point out the novel features thereof in claims.

In the accompanying drawings, Figures 1, 2, 3, 4, 5 and 6 are each a diagrammatic view showing a system of motor control embodying my invention.

Similar reference characters refer to similar parts throughout the several views.

A system of control embodying my invention depends upon the fact that the direction of rotation of a commutator type of motor is governed by the relative directions of flow of current in the armature and field windings at a given instant. A reversal of the direction of flow in either of these windings without a reversal in the other will result in a reversal of direction of rotation of the motor.

One feature of my invention is the control of direction of rotation of such motors from a distant point by the use of a minimum number of wires. A system of control embodying my invention in its simplest form requires the use of but three wires between the control switch and the motor—a control wire for each direction of rotation and a common return wire.

Figure 2:
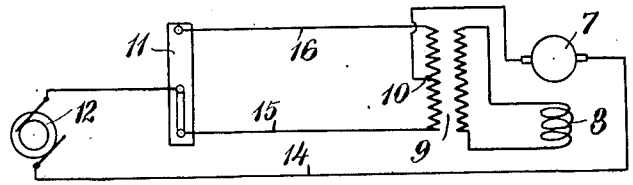

Referring now to the accompanying drawings, the numerals 7 and 8 designate armature and field windings respectively of a commutator type of electric motor. 12 designates a source of alternating current, and 11 is a control switch. A transformer is located preferably near the motor. In Figs. 1 and 2, this transformer 9 is of the type having separate primary and secondary windings, and in Figs. 3, 4, 5 and 6 it is of the auto-transformer type, having but one winding serving as both the primary and secondary. In Fig. 1, the secondary winding of the transformer is connected in series with the armature winding 7, while one terminal of the field winding 8 is connected with the primary winding at or near its middle point 10. The other terminal of the field widing 8 is connected with the source of current 12 by a wire 14. The terminals of the transformer primary winding are connected respectively with the two poles of the control switch 11 by wires 15 and 16, the movable contact of the reversing switch being connected with the source of current 12.

Considering the instantaneous values of current, the direction of flow through the field winding 8 will not be changed by reversing the movable contact of the control switch 11 from wire 15 to wire 16, but the direction of flow of the current in the primary winding of the transformer will be reversed, and consequently the direction of flow through the secondary winding and through the armature 7. That is, when the control switch is in the position shown, current will at a given instant flow into the primary of the transformer at one end and out at the middle, while if the control switch were reversed, the current would at the same instant flow in at the opposite end of the primary and out at the middle. The direction of rotation will, therefore, depend upon the position of the control switch 11.

The system shown in Fig. 2 is similar to that of Fig. 1 except that the secondary of the transformer 9 is connected in series with the field winding 8, and one terminal of the armature 7 is connected with the primary of the transformer at or near its middle point. The effect of reversing the control switch 11 will be the same as heretofore described for the system of Fig. 1, except that in this case the direction of flow of current through the field winding 8 is reversed, while the relative direction of flow through the armature winding 7 remains unaffected. The direction of rotation of the motor depends, therefore, as in Fig. 1, upon the position of the control switch 11.

Figure 3:
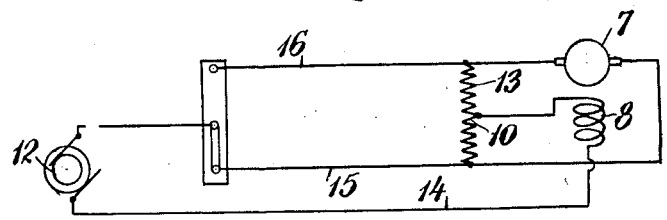
Figure 4:
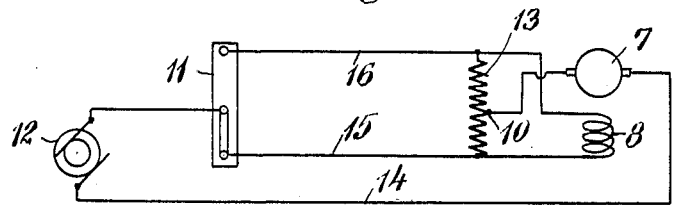

Figs. 3 and 4 are similar, respectively, to Figs. 1 and 2, except that I have here substituted an auto-transformer 13 for the two-winding transformer previously shown. The terminals of the armature winding or field winding of the motor are connected across the terminals of the transformer, while the other winding is connected with a point at or near the middle of the transformer. In this case, current flowing through one half of the transformer winding acts as a primary, producing double voltage across the outer terminals and therefore across the motor winding to which the outer terminals are connected. The effect of reversing the direction of rotation of the motor by reversing the control switch is accomplished in the same manner as hereinbefore described for the systems of Figs. 1 and 2.

Figure 5:
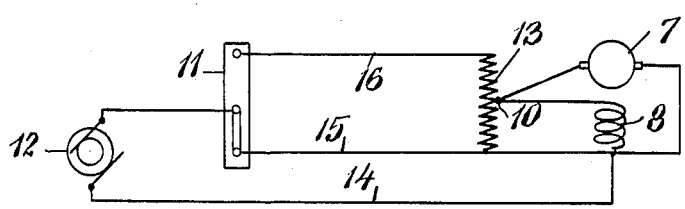

In the system shown in Fig. 5, the two control wires 15 and 16 are connected as in the preceding systems and the field winding 8 is also connected with the transformer at or near its middle point. But instead of connecting the armature across the transformer terminals, I have herein shown it as connected across one terminal and a point at or near the middle of the winding. With the control switch in the position shown in the drawing, the motor will operate under straight series conditions, with one portion of the transformer winding shunted around the armature winding. When the control switch 11 is reversed, current flows through the other portion of the transformer winding, thereby inducing voltage in the portion across which the armature winding is connected. The relative direction of flow of current in the armature will be reversed by this transformer action, while the relative direction of flow through the field winding remains the same, and the direction of rotation of the motor will therefore be reversed as in the hereinbefore described systems.

Figure 6:
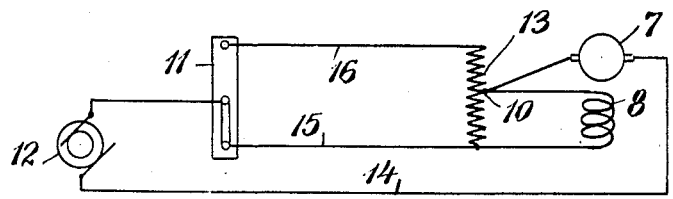

Fig. 6 shows a method of control similar to that of Fig. 5 except that the relative direction of flow of current in the field winding is reversed instead of in the armature winding.

Having thus described my invention, what I claim is:

1. In combination with an electric motor having a field winding and an armature winding, a transformer connected with said windings, a source of alternating current, and means for controlling the direction of flow of current through the transformer whereby the direction of rotation of the motor may be controlled.

2. In combination with an electric motor having a field winding and an armature winding, a transformer connected with said windings, a source of alternating current, and a controlling switch for reversing the direction of flow of current through the transformer whereby the relative directions of flow of current through the motor windings may be reversed.

3. In combination with an electric motor having a field winding and an armature winding, a transformer having its secondary connected with one of said motor windings, and one point of its primary connected with the other of said motor windings, a source of alternating current having one terminal connected with the second-mentioned motor winding, and a controlling switch for connecting the other terminal of the source of current with either end of the primary of the transformer whereby the direction of flow of current in one of the motor windings may be reversed while the direction of flow in the other winding remains constant.

4. In combination with an electric motor having a field winding and an armature winding, a source of alternating current, a transformer having its secondary connected in series with one of the motor windings, and the middle point of its primary connected with one end of the other motor winding, and a controlling switch for connecting either terminal of the primary of the transformer with the source of current whereby the relative direction of flow of current through the two motor windings may be reversed.

5. In combination with an electric motor having a field winding and an armature winding, a source of alternating current, a transformer located near the motor and having its secondary connected in series with one of the motor windings, a lead from the source of alternating current connected with one end of the other motor winding, the other end of said winding being connected with the primary of the transformer near its middle point, two leads from the other terminal of the source of alternating current, connected respectively with the two ends of the primary of the transformer, and a reversing switch for connecting either of said two leads with the source of alternating current whereby the relative direction of flow of current through the motor windings may be reversed.

6. In combination with an electric motor having a field winding and an armature winding, a source of alternating current, a transformer having its secondary connected with one of the motor windings, and the middle point of its primary connected with the other of the motor windings, a common lead connecting the source of current with the last-mentioned motor winding, two control leads connected with the primary of the transformer, and a reversing switch for connecting either of the control leads with the source of current, whereby the relative direction of flow of current through the two motor windings may be reversed.

In testimony whereof, I have signed my name to this specification in the presence of two subscribed witnesses.

LLOYD V. LEWIS.

Witnesses:
L. FREDERIC HOWARD,
S. M. LUCAS.